United States Patent [19]

Lee

[11] Patent Number: 5,413,418
[45] Date of Patent: May 9, 1995

[54] RETAINER FOR HOLDING RELATIVE POSITIONS OF ROTATING MEMBERS

[75] Inventor: George C. Lee, Novi, Mich.

[73] Assignee: Ford Motor Company, Dearborn, Mich.

[21] Appl. No.: 286,596

[22] Filed: Aug. 5, 1994

Related U.S. Application Data

[63] Continuation of Ser. No. 182,527, Jan. 18, 1994, abandoned, which is a continuation of Ser. No. 913,330, Jul. 15, 1992, abandoned.

[51] Int. Cl.[6] ............................................. F16C 19/30
[52] U.S. Cl. ..................................... 384/620; 384/621
[58] Field of Search ............... 384/621, 622, 620, 615, 384/617

[56] References Cited

U.S. PATENT DOCUMENTS

| | | |
|---|---|---|
| 3,800,928 | 4/1974 | Pray . |
| 4,166,662 | 9/1979 | Chiba et al. . |
| 4,368,932 | 1/1983 | Wolzenburg . |
| 4,484,824 | 11/1984 | Higuchi et al. . |
| 4,573,561 | 3/1986 | Deem et al. . |
| 4,733,979 | 3/1988 | Tsuruki ............................ 384/622 |
| 4,736,827 | 4/1988 | Kinoshita . |
| 4,782,931 | 11/1988 | Lederman . |
| 4,783,183 | 11/1988 | Gardella .......................... 384/622 |
| 4,910,847 | 3/1990 | Christenson et al. . |
| 4,913,271 | 4/1990 | Kinoshita et al. . |
| 4,915,512 | 4/1990 | Hilby et al. . |
| 4,961,486 | 10/1990 | Kinoshita et al. . |
| 4,981,373 | 1/1991 | Bando ............................. 384/622 |

*Primary Examiner*—Lenard A. Footland
*Attorney, Agent, or Firm*—Frank G. McKenzie; Roger L. May

[57] ABSTRACT

A retainer plate (70) limits axial displacement of two rotating rings (16,42) by providing a blocking surface contacted by the rings. An anti-friction bearing (82) includes radially directed tabs (88) that overlap the retainer plate and limit axial movement of the retainer plate and the rotating rings. The tabs of the bearing are formed integrally with a race (86) that rotatably supports roller elements (94).

10 Claims, 2 Drawing Sheets

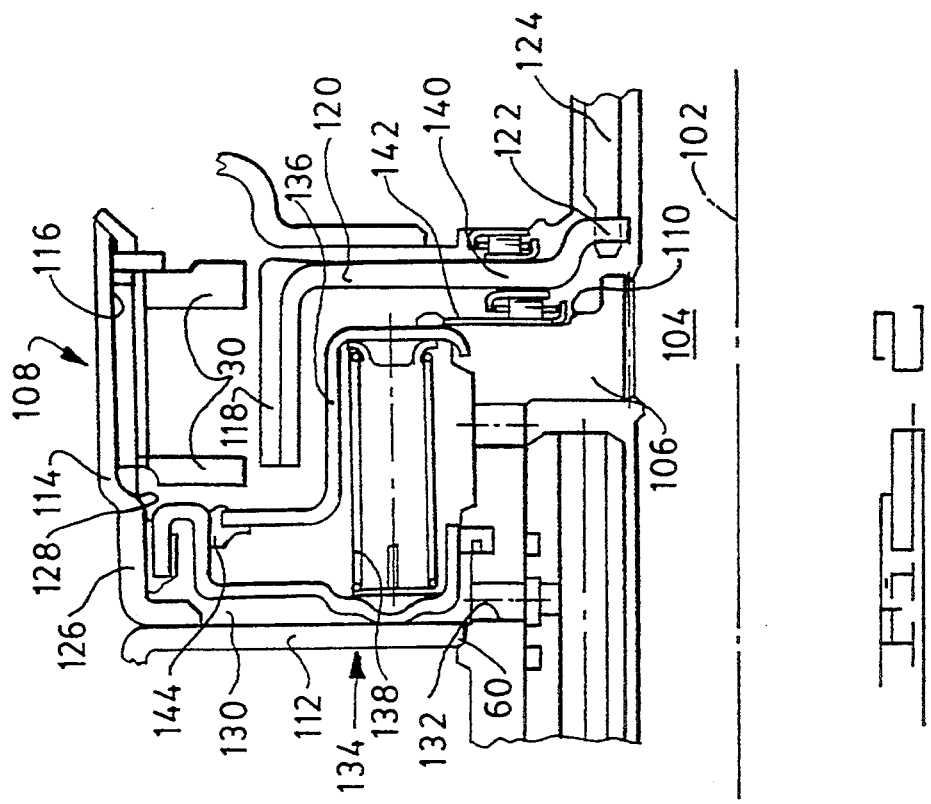
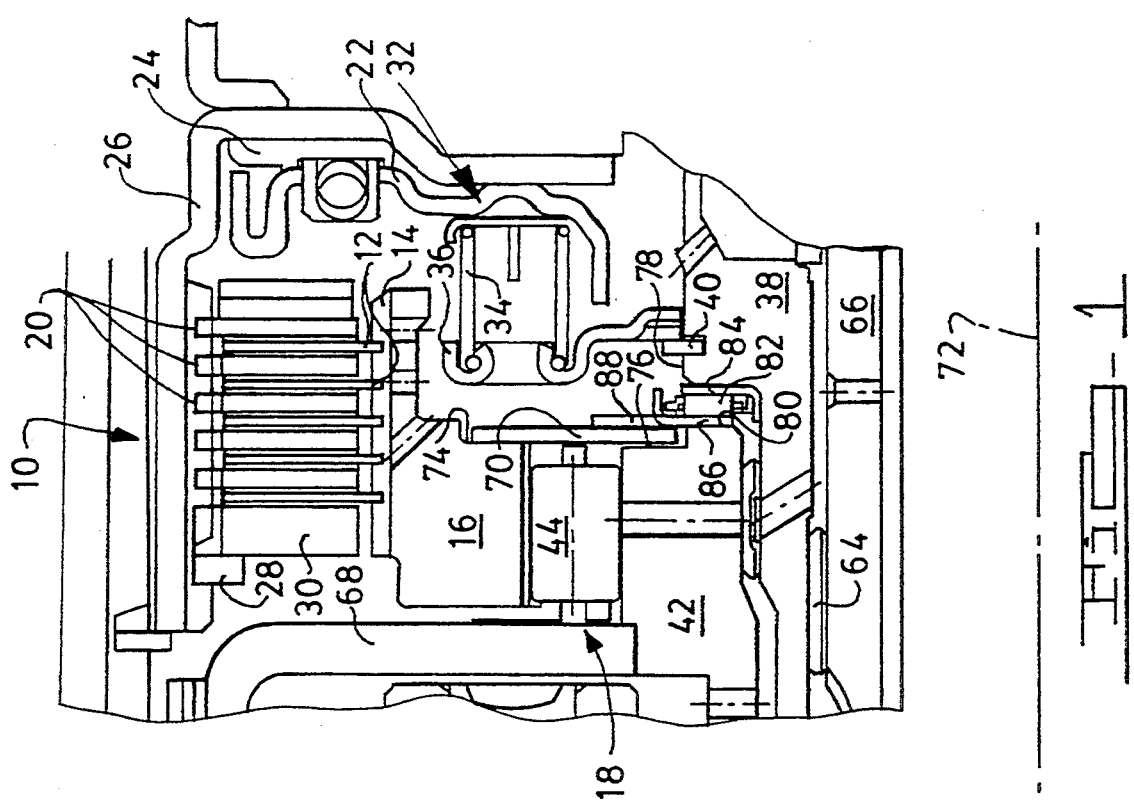

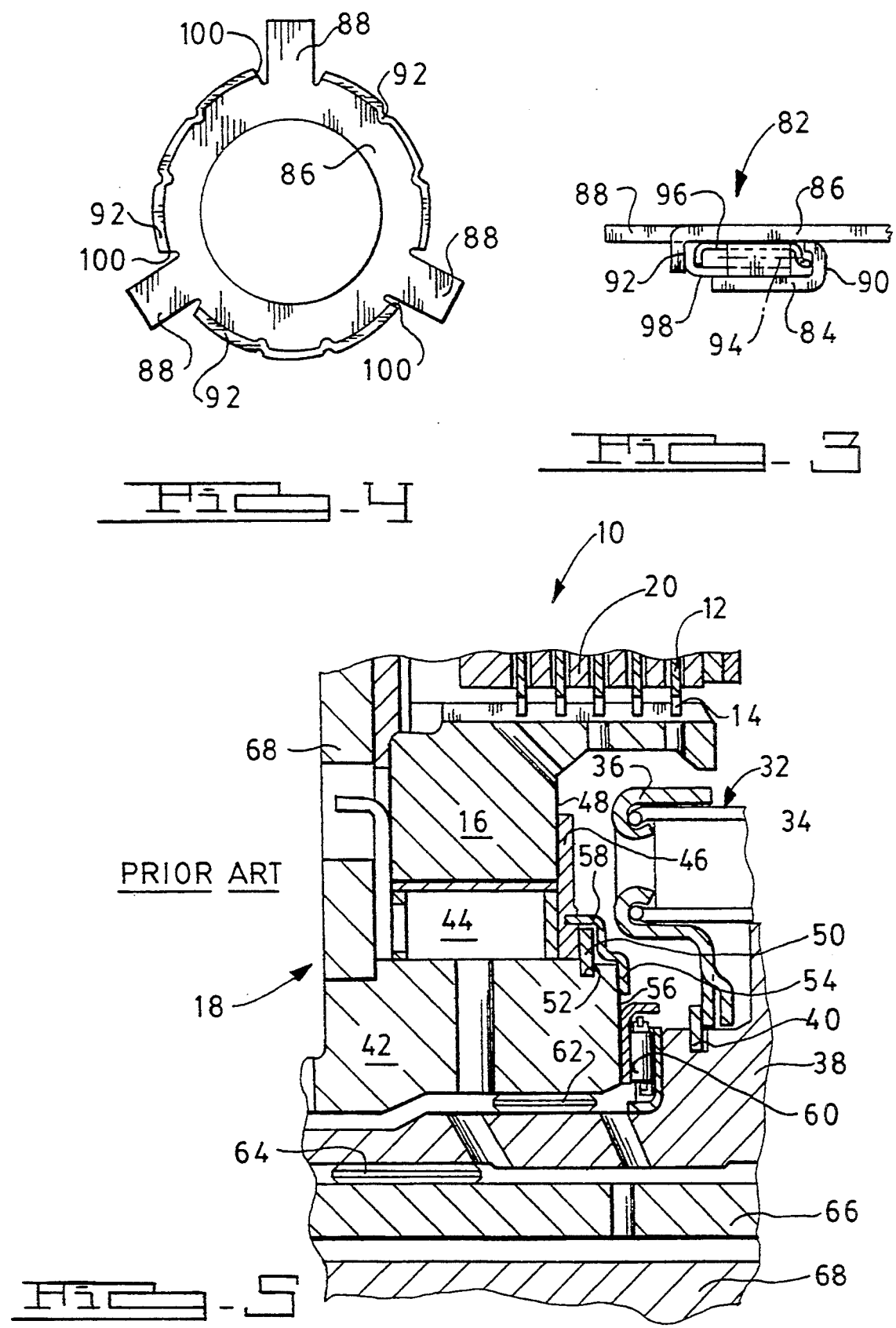

RETAINER FOR HOLDING RELATIVE POSITIONS OF ROTATING MEMBERS

This is a continuation of application Ser. No. 08/182,527, filed Jan. 18, 1994, abandoned, which is a continuation of application Ser. No. 07/913,330, filed Jul. 15, 1992, abandoned.

BACKGROUND OF THE INVENTION

1. Field of the Invention

This invention relates to the field of retainers for holding mechanical components in correct relative position, particularly to retainers for use in assemblies in which the mechanical components rotate at different relative speeds.

2. Description of the Prior Art

According to current practice, the rotating rings of an overrunning coupling or any rotating components of a mechanical system, such as those of an automotive automatic transmission, are held in proper position within the assembly using a well-known conventional technique. The retaining mechanism generally includes a circular retainer ring that overlaps a surface near an axial face of the outer rotating ring component, which is held against a relatively immovable surface at the opposite axial face. A recess, located near the longitudinal end face of the retainer ring is formed on the circumference of a second, inner rotating ring. A snap ring or circlip is fitted over the circumference of the recess and is held in position within the recess by the elastic, resilient nature of the snap ring. The snap ring is in the form of a discontinuous ring, the discontinuity extending angularly a sufficient distance to permit the snap ring to be fitted over the circumference of the recess that holds the snap ring in position. Because of the discontinuity in the snap ring, its radial stiffness is relatively low and the snap ring is susceptible to substantial radial growth due to centrifugal force, an effect of the high rotational speed (approximately 14,000 rpm.) of the second or inner ring on which the snap ring is held.

In order to provide radial stiffness to the retaining devices, a high speed retainer, a circumferentially continuous disc having terminal flanges and a web joining the flanges, is fitted over the snap ring, the end of the inner ring, and into a slot formed in the retainer ring. The flanges stiffen the high speed retainer and restrain radial expansion of the snap ring.

Generally, an anti-friction thrust bearing is located in an annular space between the end face of the inner ring and an adjacent surface of another component of the assembly. The thrust bearing transmits longitudinally directed forces between the inner ring and adjacent component, and provides anti-friction surfaces that separate the components, and facilitate low-friction relative rotation.

This conventional technique for retaining the correct longitudinal position of the inner and outer rotating rings includes a large number of components and require tedious assembly by hand.

U.S. Pat. No. 4,961,486 describes a retainer plate supported on the outer ring of a one-way coupling, the retainer including radial flow passages located between the outer ring and the retainer. Hydraulic fluid, directed toward the outer ring through a supply port, enters the flow passages and is carried to thrust bearings and a clutch located near the outer ring. The retainer is fixed in position on the outer ring by forcing complementary protuberances and recesses, formed on the outer ring and retainer, into a mutually seated position.

SUMMARY OF THE INVENTION

In accordance with the present invention, there is provided a retainer plate for limiting axial or longitudinal displacement of rotating components and for holding them in correct relative position. The retainer plate is in the form of a circumferentially continuous circular plate that overlaps end faces of at least two rotating rings held in position by the retainer assembly.

An anti-friction bearing, located within an annular space located between one of the two retained rings and another component of the assembly whose axial position is fixed 5 includes a first race that is held in contact with a shoulder of the adjacent component and a second race that bears against one of the rings held in position by the retainer assembly of this invention. The second race includes multiple radially directed tabs, mutually spaced angularly about the axis of rotation. The tabs overlap the retainer plate and limit its ability to move axially because the bearing is fixed in position against axial displacement due to being located in the annular space. Needles or roller elements, supported rotatably on the races of the anti-friction bearing, are spaced mutually about the axis of rotation by a cage assembly located between the races of the bearing.

It is an object of the present invention to retain in a proper position rotating components of a mechanical assembly without the use of an additional retaining ring, snap ring or any radially discontinuous ring whose radial stiffness is low and must be compensated by including in the retaining device an additional radially stiff ring. Instead, according to the present invention, a needle thrust bearing, of the type usually present in the vicinity of a retainer of the conventional type, is adapted to hold a relatively stiff retainer ring in position against the surfaces of the rotating rings whose positions are to be established and held by the retainer assembly.

An advantage of the retaining technique according to the present invention is that the tabs formed on one of the races of the bearing provide radially directed slots that facilitate the passage of lubricant through the bearing radially outward, thereby improving lubrication to, and increasing the component life of the bearing and other nearby rotating components.

The retainer according to the present invention, eliminates the need for machining retaining ring grooves that receive the snap ring in a convention design in current use. The accumulation of axial tolerances is reduced in magnitude because fewer components are used and because the tolerances of the bearing race are inherently tighter tolerances than those of the retainer rings used in the conventional snap ring assembly.

BRIEF DESCRIPTION OF THE DRAWING

FIG. 1 is a cross section through a portion of an automatic transmission in the vicinity of a friction clutch and overrunning coupling showing a retainer according to this invention.

FIG. 2 is a cross section through a portion of an automatic transmission in the vicinity of a friction clutch and piston return spring showing a retainer according to this invention.

FIG. 3 is a cross section through an anti-friction bearing suitable for use with this invention.

FIG. 4 is a bottom view of a race of the anti-friction bearing of FIG. 3.

FIG. 5 is a cross section through a portion of an automatic transmission showing a assembly in the prior art for retaining the relative positions of rotating members.

DESCRIPTION OF THE PREFERRED EMBODIMENT

Referring first to FIG. 1, a friction element 10, either an hydraulically actuated friction brake or friction clutch, includes multiple discs 12 connected by a spline 14 to a clutch member formed integrally with the outer ring 16 of an overrunning coupling 18. Alternating with, and located between each of discs 12 are spacer plates 20, connected by a spline to the transmission housing or an element of a friction clutch. An hydraulic piston 22, supported for movement along a longitudinal axis, moves toward the friction element 10 due to the effect of hydraulic pressure applied to a chamber 24 located behind the piston 22, within an hydraulic cylinder 26. A snap ring 28 fixes on the clutch cylinder 26 a pressure plate 30, which reacts the hydraulic force applied to piston 22 by hydraulic pressure developed in chamber 24. The piston forces the discs and spacer plates into frictional engagement, thereby driveably connecting outer race 16 to the transmission housing or other clutch element.

In order to disengage the clutch or brake 10, hydraulic pressure is vented from chamber 24 and a compression spring pack 32 forces the piston rightward out of contact with the discs and spacer plates. The compression springs 34 are contained within a spring retainer 36, fixed to a support 38 by a snap ring or circlip 40.

Coupling 18 includes an inner ring 42, which provides a surface for rotatably supporting rollers 44 located within the annular space between the inner ring 42 and outer ring 16. FIG. 5 shows a technique in the prior art for rotatably supporting the one-way coupling 18. A retainer 46 is held against the longitudinal surface 48 of the outer race by a snap ring or circlip 50, fitted within a recess 52 formed in the inner ring. A high speed retainer 54, a radially stiff continuous ring, has one flange that bears against a longitudinal surface 56 formed on the end of the inner ring and a flange that overlaps snap ring 50 and fits within a recess formed on retainer ring 46.

A thrust bearing 60, located between support 38 and the inner ring 42 of the one-way coupling, reacts longitudinally-directed forces between support 38 and inner ring 42 and facilitates their relative rotation about the horizontal axis.

A bushing 62, located between the inner ring and support 38, and a bushing 64, located between support 36 and sun gear shaft 66, rotatably support these components. The bushings maintain a fixed spacial relation among the components about the horizontal axis. The bushings are pressed with an interference fit on one of the adjacent components, the component nearest the greater thickness dimension of the bushing, that thickness being formed of steel. The material of the lesser thickness is bronze.

The end faces of the outer and inner rings located at the axially opposite end from surfaces 48 and 56 bear against an axially immovable member 68. Therefore, the inner and outer races are substantially fixed against leftward longitudinal displacement due to contact with member 68.

FIG. 1 shows an arrangement similar to that of FIG. 5 but incorporating the present invention. In the assembly of FIG. 1, the high speed retainer 58 and snap ring 50 have been eliminated entirely. A retainer 70, a ring symmetrical about the axis of rotation 72, includes a surface that contacts a longitudinal face 74 of outer ring 16, extends radially inward covering the annular space occupied by roller elements 44 and overlaps the end face 76 of the inner ring 42. Support 38 includes a shoulder 78 and the inner ring has a radial surface 80.

A thrust bearing 82 is located in the space located between the longitudinal face of shoulder 78 and surface 80. The anti-friction thrust bearing 82 includes a race 84 contacting the surface of shoulder 78. A race 86 contacts surface 80 of inner ring 42 and tabs 88 overlap retainer ring 70.

FIGS. 3 and 4 show details of the construction of anti-friction thrust bearing 82. Race 84 includes an inwardly turned flange 90; race 86 includes an inwardly turned flange 92. Needle or roller elements 94 are spaced angularly about the axis of the bearing by a cage comprising cage element 96, adjacent the inner surface of race 86, and cage element 98, adjacent the inner surface of race 84.

Preferably the races and cages of the bearing are formed by stamping sheet metal stock. Race 86 is stamped with an outside diameter corresponding to the outside diameter of tabs 88. Next the stamping is formed with relief recesses 100 and the tabs are cut from the original stamped blank. Then flanges 92 are rolled into a position substantially perpendicular to the plane of tab 88. Finally, the location of stake points at approximately 30 degree angular intervals are formed about the axis on the periphery of flanges 92.

FIG. 2 shows another application of the invention in an arrangement that is concentric about the longitudinal axis 102 of an input shaft 104. The rotating hub 106 of an hydraulically actuated friction clutch 108 is splined at 110 to input shaft 104 and is joined mechanically to clutch supports 112 and 114, which are mutually joined by welding. Support 114 has a splined surface 116 on which spacer plates similar to plates 20 of FIG. 1 are joined mechanically to the support. Clutch discs (not shown) are splined at surface 118 to a clutch element 120, connected mechanically at 122 to a rotating member 124. The discs and spacer plates alternate successively forming a stack located between the pressure plates at axially opposite ends of the clutch 103.

Hydraulic piston 126 moves rightward within hydraulic cylinder 128 when pressure chamber 130 is pressurized with hydraulic fluid supplied through passage 132 from a source of hydraulic pressure. A compression spring assembly 134, located between piston 126 and spring retainer 136, includes compression springs 138, which force the piston away from retainer 136 and out of contact with the stack of clutch discs and spacer plates, thereby disestablishing frictional contact between them and disengaging the clutch.

Thrust bearing 140 is located between clutch element 120 and the direct clutch hub 106. Tabs 142 extend radially outward from the horizontal axis of the thrust bearing overlapping an end surface of spring retainer 136, providing a blocking surface that limits movement of the spring assembly 134 rightward along the axis 102. The spring retainer carries a dynamic hydraulic seal 144 that contacts the surface of hydraulic piston 126.

The relative axial positions of hub 106 and clutch element 120 are established by the thickness dimension of bearing 140. The axial position of retainer 136 is limited by bearing contact with the tabs 142 of the bearing and the spring retainer is continually urged rightward into contact with the tabs by the compression springs 138 located between the piston 126 and retainer 136. Leftward travel of the piston and retainer is limited by contact of the piston on clutch support 112. No additional retainer, such as retainer 70 of FIG. 1, is required.

The thrust bearing and, where required, the retainer ring 70 can be used to retain clutch cylinders, shafts, one-way clutch races, and planetary pinion carriers, components of an automatic transmission.

As FIG. 1 shows, lubricating fluid circulates through the assembly by providing axial passages between shafts spaced apart by bushings 64, 62 and radial passages 100, 102 leading outward from the axial passages. Fluid that is driven outward radially by centrifugal acceleration enters bearing 82 between races 84 and 86 and flows radially through the bearing exiting at the passages located at the base of the tabs 88 where flanges 92 are interrupted. This permits enhanced fluid flow through the bearing and greater flow to adjacent components.

I claim:

1. A device for limiting displacement, comprising:
   a first ring mounted for rotation about a first axis and displacement along said axis;
   a second ring mounted for rotation about said axis and displacement along said axis;
   a retainer located adjacent the first and second rings; and
   an antifriction bearing fixed against displacement along said axis and mounted for rotation about said axis, having tabs overlapping and contacting the retainer.

2. The device of claim 1 wherein the bearing includes first and second races, an antifriction element located between the races and supported for rotation, one race formed with said tabs overlapping and contacting the retainer.

3. The device of claim 1 wherein the bearing includes first and second races, an antifriction element located between the races and supported for rotation, one race formed with tabs spaced mutually about said axis, said tabs overlapping and contacting the retainer.

4. A retainer for limiting relative displacement, comprising:
   a first ring mounted for rotation about an axis;
   a second ring located within the first ring, mounted for rotation about an axis;
   a retainer plate extending radially with respect to said axis, located for contact with the first ring and second ring; and
   an antifriction bearing fixed at a predetermined axial position relative to the retainer plate, having a tab supported for rotation about said axis, said tab overlapping and contacting the retainer plate, contact of the tab with the retainer plate limiting axial displacement of the first and second rings relative to the retainer.

5. The retainer of claim 4 wherein the antifriction bearing comprises;
   a first race having a radial surface and an axial flange directed in a first axial direction, located at a radially inner end of the radial surface;
   a second race having a radial surface spaced axially from the radial surface of the first race, an axial flange directed substantially parallel to and opposite the first axial direction, spaced radially from the axial flange of the first race, and multiple tabs spaced mutually about the axis, directed radially outward from the radial surface, the axial flanges of the second race being interrupted by the tabs; and
   rolling elements located between the radial surfaces and axial flanges of the first and second races.

6. A retainer for limiting relative displacement, comprising:
   a first ring mounted for rotation about an axis;
   a second ring located within the first ring, mounted for rotation about an axis;
   a retainer plate extending radially with respect to said axis, located for contact with the first ring and second ring; and
   a bearing supported for rotation about said axis, fixed against displacement along said axis, having a first race, a second race and rolling elements located between the first and second races, one race having tabs extending outward and located for contact with the retainer plate.

7. The retainer of claim 6 wherein:
   said first race includes a radial surface and an axial flange directed in a first axial direction, located at a radially inner end of the radial surface;
   the second race includes a radial surface spaced axially from the radial surface of the first race, an axial flange directed substantially parallel to and opposite the first axial direction, spaced radially from the axial flange of the first race, and multiple tabs spaced mutually about the axis, directed radially outward from the radial surface, the axial flanges of the second race being interrupted by the tabs; and
   the rolling elements are located between the radial and axial surfaces of the first and second races.

8. In an assembly of parts, a retainer assembly comprising:
   a retainer mounted for rotation about an axis;
   an antifriction bearing mounted for rotation about said axis, having a surface overlapping, and located for contact with a retainer, wherein the bearing includes first and second races, antifriction rollers located axially between the races, one race formed with tabs spaced mutually about said axis, said tabs overlapping and contacting the retainer plate; and
   means for holding the bearing in a predetermined position relative to the retainer.

9. In an assembly of parts, a retainer assembly comprising:
   a retainer mounted for rotation about an axis;
   an antifriction bearing mounted for rotation about said axis, having a surface overlapping, and located for contact with a retainer, wherein the bearing includes first and second races, an antifriction roller located between the races, one race formed with said surface forming a radial tab overlapping and contacting the retainer; and
   means for holding the bearing in a predetermined position relative to the retainer.

10. The retainer assembly of claim 9 wherein:
    said first race includes a radial surface and an axial flange directed in a first axial direction, located at a radially inner end of the radial surface;
    the second race includes a radial surface spaced axially from the radial surface of the first race, an axial flange directed substantially parallel to and opposite the first axial direction, spaced radially from the axial flange of the first race, and multiple tabs spaced mutually about the axis, directed radially outward from the radial surface, the axial flanges of the second race being interrupted by the tabs; and
    the rollers are located between the radial and axial surfaces of the first and second races.

* * * * *